April 7, 1964     H. H. TURNER     3,127,917
NUT CRACKER
Filed Aug. 23, 1962     2 Sheets-Sheet 1
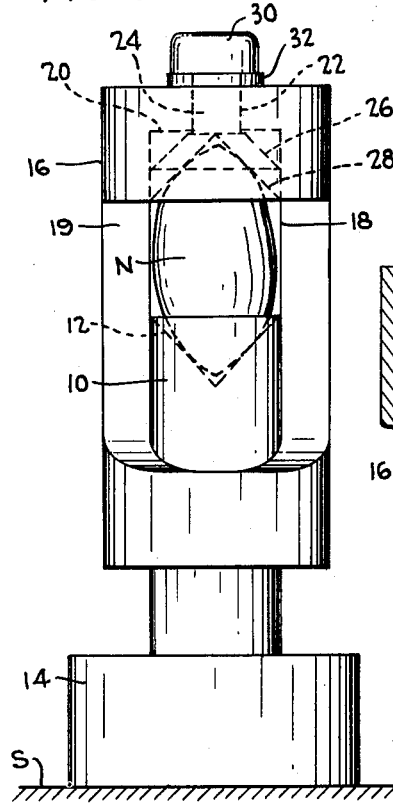
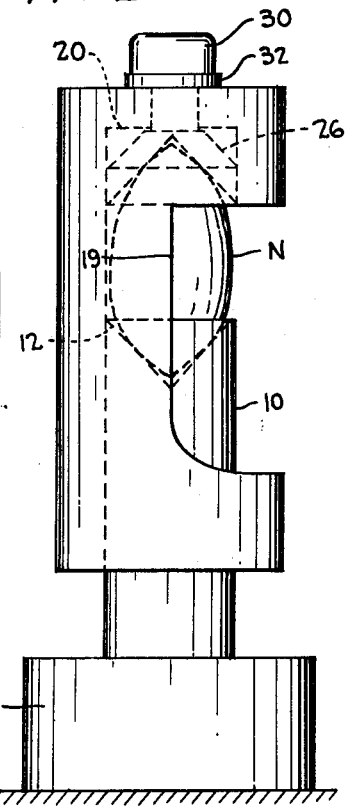
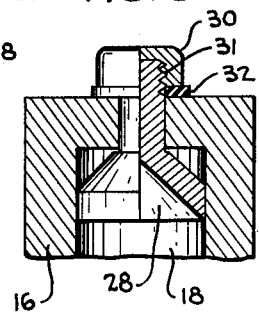
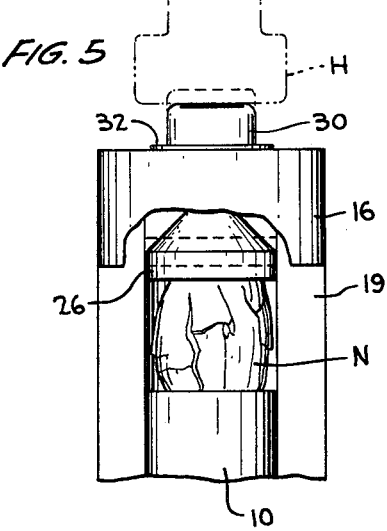
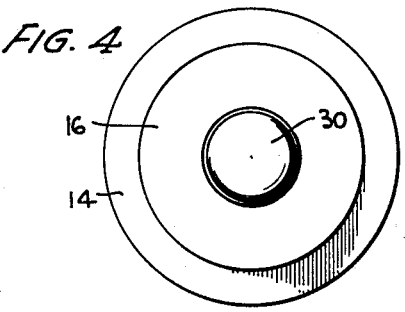
INVENTOR
HENRY HAYWOOD TURNER
BY Watson, Cole, Grindle & Watson
ATTORNEYS April 7, 1964     H. H. TURNER     3,127,917
NUT CRACKER
Filed Aug. 23, 1962     2 Sheets-Sheet 2
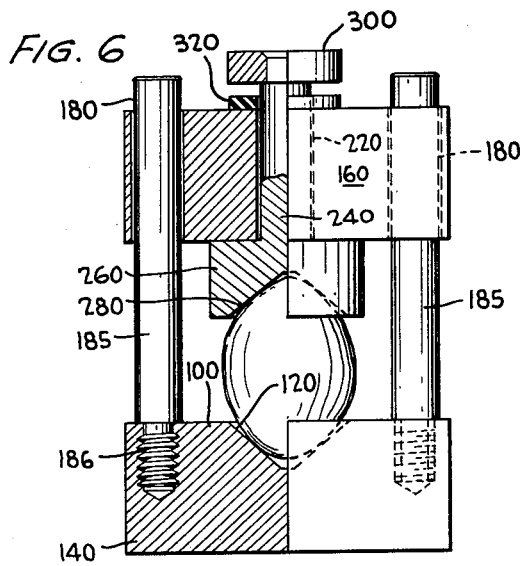
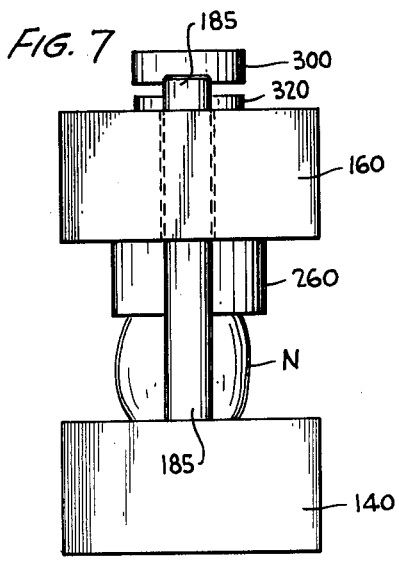
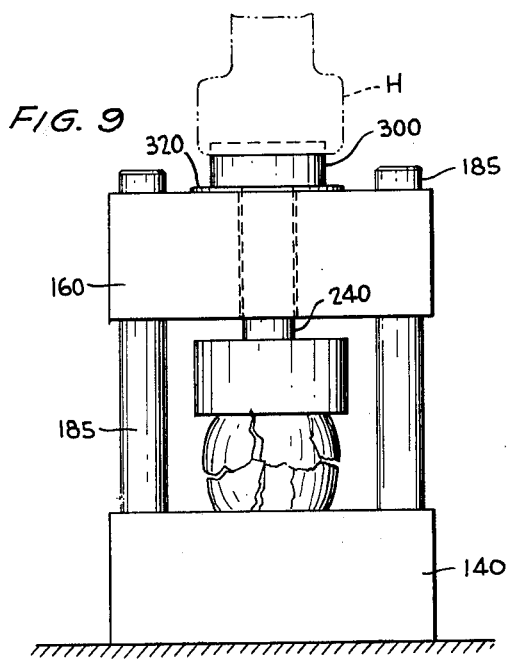
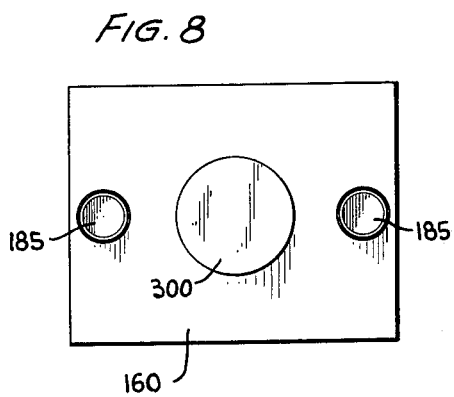
INVENTOR
HENRY HAYWOOD TURNER
BY Watson, Cole, Grindle & Watson
ATTORNEYS

United States Patent Office 3,127,917
Patented Apr. 7, 1964

3,127,917
NUT CRACKER
Henry H. Turner, 2702 Techwood Drive, Columbus, Ga.
Filed Aug. 23, 1962, Ser. No. 219,003
8 Claims. (Cl. 146—15)

This invention relates to improvements in a nut cracker of the type in which there is provided an anvil for the nut to be cracked, and the cracking force is applied to the nut through a plunger or impact member guided for movement with respect to the anvil and the nut position thereon.

It is a primary object of the invention to provide a device of this character in which the inertia of a floating or temporarily unsupported weight is utilized to limit the operative stroke of the impact member in a manner to terminate such stroke at a point where the nut shell is sufficiently cracked or shattered to permit removal of the nut meat but before the meat of the nut itself is broken or damaged.

Heretofore it has been known to utilize nut crackers or similar devices of this general type in which the operative stroke of the impact member or plunger is limited to avoid crushing of the nut meat. However, such limiting has been achieved through a fixedly positioned stop or the like requiring special adjustment whenever it is necessary to adapt it for change from use with nuts of one size range to use with those of another size.

With this in mind it is an important aspect of the present invention that the positioning of the stop means or inertia weight is self-adjusting to accommodate itself to nuts or other objects of varying sizes merely as an incident to placement of the nuts in operative position within the device.

In accordance with the invention the stroke limiting means comprises an inertia weight normally carried by the impact member or plunger so that when the plunger is positioned to a nut operatively held between it and the anvil, the act of positioning the plunger will automatically have served also to position the weight at the proper locus to permit the predetermined length of plunger stroke desired.

A further important feature of the invention resides in the novel arrangement of the inertia weight to carry out the added function of a guide means slidably interconnected to both the impact member and the anvil and guiding these parts in their relative movement.

A still further feature of the invention in its preferred embodiment consists in utilizing the inertia weight itself as one of the co-operating portions of a telescoping guide, of which the anvil constitutes the other portion, the nut being received and substantially confined within the tubular portion of this connection whereby to substantially confine the fragments of nut shell against escape under the impact action of the plunger. It has been found practical to provide an access opening or port in the side of this tubular guide portion for insertion and removal of the nuts, still without permitting escape of any substantial amount of shell fragments.

A further incidental feature of the invention consists in utilizing a cushioning or damping member between the inertia weight and the impact member, thus to avoid damage to or deformation of the interengaging portions of these respective parts incident to the stroke limiting action of the inertia member.

Still further features and objects of the invention will be apparent from consideration of the following detailed description of the invention in conjunction with the accompanying drawings of two of the various possible embodiments thereof.

In the accompanying drawings:

FIGURE 1 is a front elevation of a nut cracker incorporating the various features of the invention, same being shown with a nut operatively positioned therein preparatory to a cracking operation;

FIGURE 2 is a side elevation of the device shown in FIGURE 1;

FIGURE 3 is a cross section in an axial plane showing how the impact member is associated with the inertia weight in this embodiment, the impact member itself being shown partly in side elevation and partly in axial section;

FIGURE 4 is a plan view of the device as seen in any one of FIGURES 1, 2 and 3;

FIGURE 5 is a fragmentary view similar to FIGURE 1 showing the parts in broken lines in the positions which they assume in FIGURE 1 prior to the impact or impacting action of the impact member or plunger, and showing the same parts in full lines as they appear at the conclusion of the impacting stroke of the impact member, a portion of a hammer head or other impact producing implement being indicated in broken lines;

FIGURE 6 is a view partly in front elevation and partly in vertical section through a modified form of nut cracker device in accordance with the invention, showing a nut operatively positioned therein ready to be cracked;

FIGURE 7 is a side elevation of the device shown in FIGURE 6;

FIGURE 8 is a plan view of the device shown in FIGURE 6; and

FIGURE 9 is a view similar to FIGURE 6 but showing the parts in full lines in the positions which they will have assumed at the end of the operative cracking stroke of the impact member under the influence of a hammer blow, the hammer itself being indicated in broken lines. The positions of the various parts prior to the impacting action is indicated by the broken lines in this figure.

Referring now in detail to the accompanying drawings and first considering the preferred embodiment of the invention as illustrated in FIGURES 1 through 5, inclusive, the anvil 10 comprises the upper end of a rigid preferably cylindrical metal column the upper end preferably being formed with a conical socket or other suitably shaped recess 12 for reception in more or less usual manner of the lower end portion of a nut N, the illustrated form of nut being a pecan, though obviously the invention is adapted for use with the various other species of nuts. The anvil 10 is rigidly connected at its lower end to a suitable supporting base 14 which normally will rest on a flat horizontal supporting surface such as S to maintain the anvil in an axially upright position. It is desirable to form both the base 14 and anvil 10 of comparatively dense metal or other strong material having a combined substantial mass such that their combined inertia will oppose any tendency toward movement of the anvil incident to the nut cracking action, even though the supporting surface S be soft or yieldable, or should the device be turned on its side, with no supporting medium to resist movement of the anvil incident to the nutcracking action. In this lateral position, adjustments for accommodation of nuts may be made by movement of the anvil and base alone.

The inertia weight 16 in the present embodiment is shown in its preferred form as comprising a length of relatively thick walled heavy tubing having its internal bore 18 freely slidably receiving the anvil 10. It will be seen that bore 18 though open at its lower end for reception of the anvil 10, is closed at its upper end by the wall 20.

However, the wall 20 is provided with a central opening preferably in the form of a circular bore 22 therethrough. Through the bore 22 is slidably disposed the plunger or impact member 24. At its lower end, impact member 24 carries a relatively enlarged socket-defining portion 26 having a downwardly diverging conical socket or recess 28 in vertically opposed axially aligned relationship to the recess 12 within the anvil and adapted to receive the upper end of the nut N. Since the socket defining portion 26 at the lower end of the impact member 24 is of larger diameter than the bore 22, the upward movement of the member 24 through the bore will be limited by engagement of portion 26 with the walls or shoulder 20.

Preferably the inertia member or sleeve 16 will be provided with an opening or port 19 through its side wall to permit operative positioning of a nut within the device through such opening, and its removal therefrom at the conclusion of the cracking operation.

At its upper end the plunger or member 24 is provided an enlargement in the form of a striking knob 30 which may be threaded thereon as at 31 in FIGURE 3. Since the knob 30 and the portion 26 of the impact member 24 are both of substantially greater diameter than the bore 22 through which the plunger is guided, they will serve effectually to limit the vertical movement of the impact member through its guide bore and thus may effectively determine the length of the operative stroke of the impact member. While the striking knob 30 and the socket defining portion 26 in the present embodiment are utilized also as a means for limiting the impact stroke it will be readily apparent that any other suitable movement limiting means or stops may be employed for this purpose. It is important only that the motion limiting means, regardless of the form it may assume, defines a lost motion connection between the impact member and the inertia weight, so limiting the operative downward stroke of the impact member that the stroke is sufficient to permit adequate breaking of the nut shell, but insufficient to break the nut meat.

Inasmuch as the impact is normally applied to the impact member or plunger as by means of a blow on the upper surface of its striking knob 30, it is desirable to provide a cushioning element such as the annular washer 32 of soft rubber or similar resilient material interposed between the striking knob 30 and the upper end of the wall 20 around the bore 22 to cushion the impact against this wall of the striking knob 30.

In the use of the invention, which is believed to be obvious from the foregoing description, the inertia weight or sleeve 16 will be raised upwardly appreciably from its position shown in FIGURES 1 and 2 to provide an enlarged space between the anvil 10 and the lower portion 26 of the impact member so that a nut N may be inserted in this space through the opening 19. After being inserted through the opening 19 the lower end of the nut is placed within the recess 12 of the anvil and the sleeve is lowered so that the upper end of the nut is received within the recess 28 of the impact member. At this point the nut itself is supporting the inertia member 16 through the impact member 24 and the engagement of its enlarged portion 26 with the upper end wall 20 of the weight 16. Thus the positions of the parts are such that the plunger 24 is at the upper extremity of its range of permissable movement with respect to the inertia weight 16 and the latter will be accurately positioned to permit a full operative downward stroke of the member 24 under the influence of a hammer blow on its striking knob 30. At the time of initial application of the hammer blow, the striking knob 30 will be in the position indicated by the broken lines in FIGURE 5. The full impact of this hammer blow will initially be transmitted through the plunger 24 to the nut N in such manner as to substantially crack and partially shatter the shell of the nut as indicated in FIGURE 5.

However, as the plunger moves downwardly under the force of the hammer blow through its operative stroke, its downward movement will be increasingly transmitted through the washer 32 to the inertia weight 16. The mass of this inertia weight will be so selected that normally it is substantially greater than that of the hammer H or other impact applying element and will thus oppose and bring the movement of the plunger or impact member 24 to a stop with but little downward displacement of the weight 16 in comparison to that of the impact member. Obviously the mass of the element 16 may be made so great that its actual displacement will be negligible. However, for practical considerations and in order to facilitate the practical use of the device it is found that the inertia weight or element 16 may have a mass such as will permit it to be displaced a very small amount which will be added to the operative stroke of the impact member.

In any event it has been found that the inertia weight 16 may co-operate with the impact element 24 in actual practice to achieve an extremely high degree of success in cracking nuts such as pecans in a manner to rather completely crack the shells thereof without damaging the nut meat.

It will be obviously immaterial whether the several parts of the device are arranged for relative movement in a vertical direction, as herein illustrated, or in a horizontal or other direction. For instance, if the device is laid on its side the relative movements of the parts will be horizontal, but the mode of operation will be unchanged except that the parts will require to be manually moved apart and together for operative positioning of a nut. During the cracking operation however the combined inertia of the anvil 10 and its base 14, in the preferred embodiment of FIGURES 1 through 5, will cause the anvil to remain substantially stationary while the nut is crushed against the anvil by action of the impact member 26. The same will be true as to the alternative embodiment of the invention.

The weight 16 by virtue of its tubular or sleeve-like formation in this embodiment serves to guide itself upon the cylindrical anvil 10 due to the telescopic relationship of the two parts, and moreover the weight 16 substantially surrounds and confines the nut to prevent escape of any substantial portion of the broken shell fragments under the force of the impacting action. Where it is desired to completely confine these shell fragments, the access opening 19 through the wall of the tubular weight 16 may be omitted, in which event the weight 16 may be simply completely removed from the anvil 10 each time it is desired to insert a fresh nut or to remove a cracked one.

Referring now to the modified form of the invention shown in FIGURES 6 through 9, inclusive, the basic co-operation of the parts is retained, although the direct slidable association of the inertia weight with the anvil in a manner to form an enclosed compartment about the nut, as in the preceding embodiment is omitted.

In place thereof the anvil 100 with its upwardly opening conical recess 120 incorporates merely the central portion of a rectangular base 140.

The inertia weight 160 is shown as a metal block of rectangular shape in plan having guide bores 180 therethrough adjacent its opposite ends. These slidably receive the vertical guide posts 185 rigidly supported by the base 140 as by the threaded connections 186 respectively.

The impact member or plunger 240 is slidably disposed through the central vertical bore 220 through the inertia weight. Impact member 240 has an enlarged lower end 260, downwardly recessed at 280 above and in vertical alignment with the recess 120 and the anvil 100, as in the preferred embodiment. The enlarged striking head 300 of the plunger preferably has the resilient spring washer 320 interposed between it and the inertia weight 160 and the head 300 and plunger lower end 260 function as stops just as in the preferred embodiment to govern the effective length of impact stroke of the impact member.

It will be readily apparent that in each form and position of the invention when the nut is operatively positioned within the device preparatory to the cracking action, the impact member 24 or 240, as the case may be, will engage the nut and will arrest the inertia weight at the proper locus for precisely governing the length of stroke of the impact element to crack the nut shell while avoiding damage to the nut meat. This positioning of the inertia member obviously is achieved in easy manner simply as an incident to placing the nut within the device and without the necessity for any additional manipulations. Moreover, it will be seen that in the invention the inertia weight in each of the forms shown establishes a slidable coupling between the impact member and the anvil to guide the impact member in accurate alignment with the anvil. While the value of this feature is not to be underestimated, it is nevertheless contemplated that from a broad standpoint its presence is not essential to the invention so long as some suitable guide means is provided for the impact member. To the same end it is not essential that the inertia weight be connected in any way with the anvil.

In this application I have shown and described a percussion device for cracking a nut between two axially aligned sockets, one socket within an impact member of relatively small mass whose movement is arrested after a short cracking excursion by coupling through a lost motion connection with a heavier inertia weight, and the other socket within an anvil of sufficiently great inertia to remain substantially stationary as the nut is cracked against it, with either socket capable of movement independent of the other along the axis of alignment for introduction and removal of nuts, and with freedom from mechanical interconnections urging either socket toward or away from the other.

In this application I have shown and described only the preferred embodiment of my invention together with but a single modification thereof, all simply by way of illustration of the preferred mode of practicing my invention. However, I recognize that the invention is capable of other and different embodiments and that its several details are susceptible of modification in various respects all without departing from the invention. Accordingly the drawings and description therein are to be construed as merely illustrative in nature and not as limiting the invention.

Having thus described my invention, I claim:

1. A nut cracker comprising an anvil formed with an upwardly opening recess for reception of a nut to be cracked, an inertia weight, means guiding said inertia weight for free and unrestricted movement at all times with respect to the anvil, said means constituting the sole connection between said anvil and said inertia weight, an impact member guided for generally vertical movement relative to both said weight and the anvil, said member having an operative nut striking portion positioned to engage and rest on a nut operatively positioned in said recess, said portion defining a relatively opposed complementary recess for partial reception of the upper end of said nut, said impact member having means normally abutting against and supporting the weight in raised position above the anvil and constituting the sole such supporting means, said impact member and said weight having a lost motion connection permitting a restricted amount of downward movement of the member independently of the weight and thereafter coupling said member and said weight together for downward movement together.

2. A nut cracker comprising a base, a vertically disposed pillar-like anvil fixed on said base at its lower end and formed with a recess on its upper end to receive and position a nut, an inertia weight in the form of a tubular sleeve freely slidable on said anvil, an impact member slidably guided in said sleeve through its upper end, the lower end of said member being disposed for operative engagement with a nut supported on said anvil, and means defining a lost motion connection between said sleeve and the impact member for permitting a limited operative downward stroke of the impact member independently of the sleeve.

3. A nut cracker as defined in claim 2 in which said sleeve is provided with an opening thereinto through its side wall for the insertion and removal of nuts.

4. A nut cracker as defined in claim 2 in which said lost motion connection comprises enlarged portions at the opposite vertical ends of the impact member adapted to abut against the member at the opposite extremities of the motion permitted thereby.

5. A nut cracker as defined in claim 4 including a resilient cushioning member interposed between the uppermost said enlargement and the end of the sleeve.

6. A device of the character described comprising an anvil, an inertia weight, means guiding said anvil and said inertia weight for relative motion toward and away from each other for reception therebetween of a nut to be cracked, said anvil having adequate inertia to remain substantially stationary while the nut is cracked against it, and an impact member carried by said inertia weight for a limited operative stroke toward said anvil, said inertia weight having adequate mass to remain substantially stationary when limiting the operative stroke of said impact member.

7. A nut cracker comprising an anvil, an inertia weight, means guiding said inertia weight and said anvil for free and unrestricted relative movement at all times along a predetermined path toward and away from each other, said means constituting the sole connection between said anvil and said inertia weight, and an impact member guided by said inertia weight for movement toward and away from said anvil, said impact member and said inertia weight having a lost motion connection permitting a restricted amount of movement of the impact member independently of the weight and thereafter positively coupling said member and said weight together for subsequent movement.

8. A nut cracker as defined in claim 7 in which said means guides the said inertia weight for relative vertical movement with respect to the anvil.

References Cited in the file of this patent

UNITED STATES PATENTS

| 1,883,529 | Buckwalter | Oct. 18, 1932 |
| 2,200,515 | Moeller | May 14, 1940 |
| 2,656,866 | Rumsey | Oct. 27, 1953 |

FOREIGN PATENTS

| 567,832 | Great Britain | Mar. 5, 1945 |